(12) United States Patent
Wang

(10) Patent No.: US 11,492,502 B2
(45) Date of Patent: Nov. 8, 2022

(54) POLYIMIDE COMPOSITE, PREPARATION METHOD, AND APPLICATION THEREOF

(71) Applicant: WUHAN CHINA STAR OPTOELECTRONICS SEMICONDUCTOR DISPLAY TECHNOLOGY CO., LTD., Hubei (CN)

(72) Inventor: Yamin Wang, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 278 days.

(21) Appl. No.: 16/609,874

(22) PCT Filed: Apr. 26, 2019

(86) PCT No.: PCT/CN2019/084439
§ 371 (c)(1),
(2) Date: Oct. 31, 2019

(87) PCT Pub. No.: WO2020/211110
PCT Pub. Date: Oct. 22, 2020

(65) Prior Publication Data
US 2020/0332134 A1    Oct. 22, 2020

(30) Foreign Application Priority Data
Apr. 19, 2019  (CN) .......................... 201910316613.9

(51) Int. Cl.
C08L 79/08   (2006.01)
C09D 7/62    (2018.01)
C08G 73/10   (2006.01)
C09D 179/08  (2006.01)
C08B 37/16   (2006.01)

(52) U.S. Cl.
CPC ............ *C09D 7/62* (2018.01); *C08B 37/0015* (2013.01); *C08G 73/1007* (2013.01); *C08G 73/1071* (2013.01); *C09D 179/08* (2013.01)

(58) Field of Classification Search
CPC . C08L 5/16; C08K 2003/2275; C08J 2379/00
See application file for complete search history.

(56) References Cited

U.S. PATENT DOCUMENTS

2004/0005177 A1* 1/2004 Oyama ............... G03G 15/2053
                                                    399/328
2013/0046057 A1* 2/2013 Xiao .................... C08G 73/101
                                                    525/54.24

OTHER PUBLICATIONS

Mahpishanian et al One-step green synthesis of-cyclodextrin/iron oxide-reduced graphene oxide nanocomposite with high supramolecular recognition capability, Journal of Chromatography A1485, 2017, pp. 32-43, Available online Jan. 14, 2017.*
Hong et al Cyclodextrin grafted polypyrrole magnetic nanocomposites toward the targeted delivery and controlled release of doxorubicin, 427 (2018), 1189-1198, Available online Sep. 6, 2017.*
Faghihi et al Magnetic and Heat Resistant Poly(imide-ether) Nanocomposites Derived from Methyl Rich 9H-xanthene: Synthesis and Characterization, Chinese J. Polym. Sci. 2018, 36, 822-834, Published online Mar. 2, 2018.*

* cited by examiner

Primary Examiner — Gregory Listvoyb
(74) Attorney, Agent, or Firm — Mark M. Friedman

(57) ABSTRACT

The present invention provides a polyimide composite having a structural formula of PI/Fe$_3$O$_4$-($\beta$-CD-Ada)x, wherein x=3-5. One aspect of the invention provides a polyimide composite. By introducing Fe$_3$O$_4$ as a host material of an electromagnetic wave absorption material and introducing a guest material, a repairing property of the material itself is imparted by an interaction between the host material and the guest material. Therefore, the polyimide composite has an electromagnetic radiation shielding property and a self-repairing property.

12 Claims, 1 Drawing Sheet

POLYIMIDE COMPOSITE, PREPARATION METHOD, AND APPLICATION THEREOF

FIELD OF INVENTION

The present invention relates to the field of functional materials involved in planar display panels, and in particular to a functional polyimide (PI) material.

BACKGROUND OF INVENTION

Due to industrialization, manpower is replaced by equipment, such that the mass production can be achieved. With gradual increase in communication equipment and electrical devices, the environment where we live is increasingly exposed to electromagnetic radiation pollution. Impact from electromagnetic radiation is more obvious in factories. Electromagnetic radiation greatly affects human bodies.

Furthermore, with progress of electromagnetic technology, also brings some social problems. For example, four major pollutions are water pollution, air pollution, noise pollution, and electromagnetic radiation pollution. In equipment factories, most coatings currently used do not have the ability to prevent electromagnetic radiation pollution.

Since 1993, the industry has begun to conduct further research on electromagnetic radiation shielding coatings (Bethune D S, Kiang C H, de Vries M S, et al. Cobalt-catalysed growth of carbon nanotubes with single-atomic-layer walls. Nature 1993; 363: 605-6). With development of society, countries of the world have increased their R&D investment in this research in recent years. A conventional method for reducing electromagnetic radiation pollution is to control the radiation of the electromagnetic radiation within a certain range or to absorb 90% of its radiation by a material.

One usual detection of electromagnetic radiation absorption can be calculated by the transmission line theory. In the range of −10 dB, the electromagnetic radiation can be reduced to more than 90%, when the absorption reaches −20 dB, the electromagnetic radiation of the material can be reduced to 99%, and when the absorption reaches −30 dB, the electromagnetic radiation of the material can be reduced to 99.9%. It greatly reduces electromagnetic radiation pollution. At the same time, people can choose to shield more than 90% of electromagnetic radiation pollution as an effective starting point, that is, it can be used as electromagnetic radiation absorption material if reaches −10 dB.

At present, the electromagnetic radiation shielding materials are mainly prepared by preparing composite polymer materials. Using a polymer material as a base and introducing metal oxides or particles to the base for imparting the material with a better shielding effect. However, coating materials are often prone to force majeure damage. The damage greatly affects its electromagnetic radiation absorption performance. Therefore, the development of electromagnetic radiation absorption material with a self-repairing property is very meaningful.

Technical Problem

One aspect of the present invention provides a polyimide composite which introduces $Fe_3O_4$ as a host material of an electromagnetic radiation absorption material and introduces a guest material to impart it with repair property by an interaction between the host material and the guest material. Thereby, it becomes a polyimide material with both an electromagnetic radiation shielding property and a self-repairing property.

Technical Solution

The technical solution adopted by the present invention is as follows:

A polyimide composite having a structural formula of $PI/Fe_3O_4$-($\beta$-CD-Ada)x, wherein x=3-5.

Further, in one embodiment, the preparation material used in the polyimide composite according to the present invention includes an assembly of $Fe_3O_4$-($\beta$-CD-Ada)x and polyamic acid, wherein x=3-5.

Further, in another embodiment, a structural formula of the polyamic acid is:

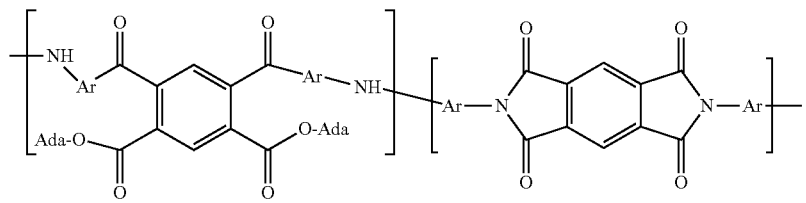

Further, in another embodiment, the raw materials used in the assembly $Fe_3O_4$-($\beta$-CD-Ada)x includes $Fe_3O_4$ and $\beta$-cyclodextrin.

One of the specific bonding methods of the assembly is, but not limited to, bonding the OH group of $Fe_3O_4$ to the COOH group at the $6_{th}$ carbon position of the carboxylated cyclodextrin.

Further, in another embodiment, the preparation materials used in polyamic acid include diamine: $NH_2$—Ar—$NH_2$, dianhydride, and sodium adamantane carboxylate.

Further, in another embodiment, wherein the diamine: $NH_2$—Ar—$NH_2$ adopts a structural formula of one of the following five structural formulas:

Ar is anyone of a, b, c, d, and e. The structural formulas of a, b, c, d, and e are as follows:

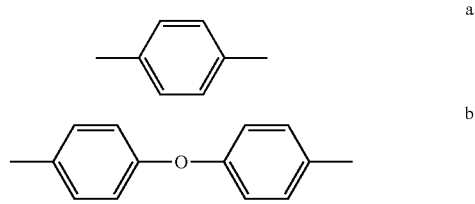

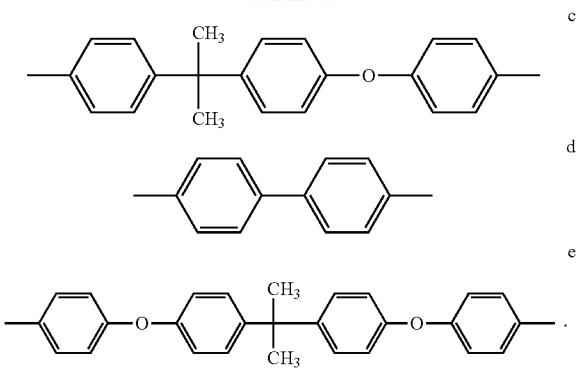

Further, in another embodiment, the structural formula of the dianhydride includes one of the following two structural formulas:

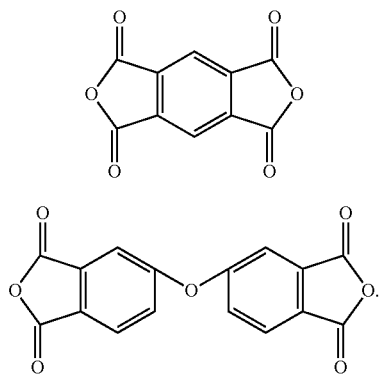

Further, a further aspect of the present invention provides a method for preparing the polyimide composite, comprising the following steps:

Step S1, preparing a host molecule, wherein the host molecule is prepared by grafting β-cyclodextrin on $Fe_3O_4$ particle, and obtaining a product designated as compound A.

Step S2, preparing an assembly, wherein the assembly is formed by selecting adamantane as a guest molecule and to react with the compound A as a host molecule to obtain an assembly designated as compound E.

Step S3, preparing a polyamic acid solution, wherein the polyamic acid solution is prepared by selecting diamine: $NH_2$—Ar—$NH_2$ designated as compound C, dianhydride designated as compound D, and sodium adamantane carboxylate to react in a solution, and wherein the obtained polyamic acid solution, designated as compound F, contains the polyamic acid having the guest molecule grafted with an adamantane molecule; and Step S4, preparing a polyimide composite, wherein the polyimide composite is prepared by formulating the compound E and the compound F to form a mixture, and wherein the $Fe_3O_4$ contained in the mixture is within a ratio of 3-18% by weight.

Further, in another embodiment, in step S2, a molar ratio of the compound A which is the host molecular to the adamantane which is the guest molecule is (2-3):(1-3).

Further, in another embodiment, in the step S3, the compound C, the compound D, and the sodium adamantane carboxylate are sufficiently dissolved in a solvent of N-methyl pyrrolidone and are sufficiently stirred, and then the solvent is heated to 70-90° C. for 6-10 hours, whereby the polyamic acid solution is obtained.

Further, in another embodiment, in the step S3, a molar ratio between the compound C and the compound D is within a range of 1.05-2.

Further, another aspect of the present invention provides an application of the polyimide composite. The application is forming a polyimide film on a glass substrate of a display panel.

Further, another aspect of the present invention provides a method for preparing a polyimide composite, the polyimide composite constitutes a polyimide film on a display panel, the method includes the following steps:

Providing the polyimide composite involved in the present invention, wherein the polyimide composite contains $Fe_3O_4$ within a ratio of 3-18% by weight.

Stirring a polyamic acid solution to form a uniformly mixed polyamic acid solution, then raising a temperature of the polyamic acid solution to 70-100° C., and thereafter the polyamic acid solution is spin-coated on a glass substrate of the display panel; and Removing 50-70% of solvent in the polyamic acid solution coated on the glass substrate under a temperature of 110-130° C., and raising the temperature and then keeping the temperature at a constant temperature of 400-450° C. for performing a constant temperature heating process until a polyimide film formed on the glass substrate is finally, obtained.

Further, in one embodiment, stirring the prepared polyamic acid solution is carried out at 0° C., wherein the stirring time is in a range of 24-96 hours.

Further, in one embodiment, a heating rate in the heating process is 4-8° C./min.

Further, in one embodiment, the constant temperature process is within a range of 0.8-1.2 hours.

Beneficial Effect

The invention relates to a polyimide composite which is imparted with good electromagnetic radiation shielding property by introducing magnetic particles $Fe_3O_4$ to a material. Repair ability of the material is imparted by the interaction between a host molecule and a guest molecule. Therefore, a polyimide composite having both properties of electromagnetic radiation shielding and self-repairing is realizing.

In the industry, there is no polyimide composite material having both electromagnetic radiation shielding property and self-repairing property. It is believed that there will be more explorations in the application in the future. The present invention provides novel idea and solution for such exploration.

Further, the polyimide composite material according to the present invention can be widely applied to factories having electromagnetic radiation, for example, organic light emitting diode (OLED) factories, semiconductor factories, etc., it has broad application prospect and market prospect.

DESCRIPTION OF DRAWINGS

In order to more clearly illustrate the technical solutions in the embodiments of the present invention, the following figures described in the embodiments will be briefly introduced. It is obvious that the drawings described below are merely some embodiments of the present invention, other drawings can also be obtained by the person ordinary skilled in the art based on these drawings without doing any creative activity.

DETAILED DESCRIPTION OF PREFERRED EMBODIMENTS

Figure 1:
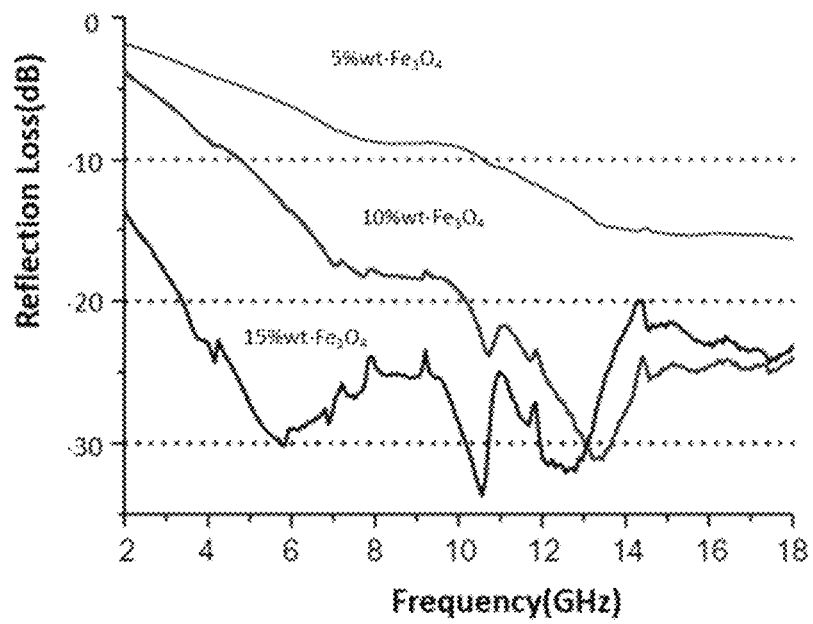
FIG. 1 is a graph showing electromagnetic radiation absorption performances of coatings composed of three different polyimide compositions with different $Fe_3O_4$ contents.

The following description is based on the embodiments of the present invention as illustrated, and should not be construed as limiting the embodiments that are not described herein.

Hereinafter, a polyimide composite, a preparation method, and a technical solution thereof of the present invention will be further described in detail with reference to the accompanying drawings and embodiments.

The present invention relates to a structure of the polyimide composite and the method for preparing the same. In order to avoid unnecessary description and to provide a clear description, a polyimide composite material structure according to the present invention will be described in detail below based on the preparation method.

A polyimide composite according to the present invention is prepared by four steps, described as follows:

First, grafting a $Fe_3O_4$ particle with β-cyclodextrin to form a functional particle with a repair property, that is, a host molecular structure is formed.

Secondly, selecting a guest molecule for inclusion to form an assembly.

Following, preparing a polyamic acid solution.

Finally, mixing the assembly with the polyamic acid solution in a certain ratio to obtain a polyimide composite having an electromagnetic radiation shielding property and a self-repairing property.

The above four steps will be described in detail below with reference to specific parameters.

Step S1, preparing a host molecule, wherein the host molecule is prepared by grafting β-cyclodextrin on $Fe_3O_4$ particle, and a product designated as compound A is obtained.

One specific bonding method involved is that the OH group of $Fe_3O_4$ is bonded to the COOH group at the 6th carbon position of the carboxylated cyclodextrin.

Step S2, preparing an assembly:

Selecting 1-3 mmol of adamantane as a guest molecule (common guest molecule included in β-cyclodextrin) and 2-3 mmol of $Fe_3O_4$ particles grafted with β-cyclodextrin (compound A) to react at room temperature, and stirred for 24-96 hours. Thereafter, the assembly $Fe_3O_4$-(β-CD-Ada)x is formed, where x=3-5. The assembly is designated as a compound E, wherein the molar ratio of the host molecule (compound A) to the guest molecule (adamantane) is preferably 1:1.

Step S3, preparing a polyamic acid solution:

Specifically, subjecting 1-9 mmol of diamine: $NH_2$—Ar—$NH_2$ (designated as compound C), 1.1-9.9 mmol of dianhydride (designated as compound D), and 1.1-9.9 mmol of sodium adamantane carboxylate to sufficiently dissolved and stirred in a solvent of N-methylpyrrolidone. And then raising the temperature to 80° C. for 6-10 hours to form a polyamic acid solution (designated as compound F). Specifically, it may be referred to as a polyamic acid containing a guest molecule grafted with an adamantane molecule.

Wherein the diamine: $NH_2$—Ar—$NH_2$ has a structural formula of one of the following five structural formulas:

Ar is anyone of a, b, c, d, and e, the structural formulas of a, b, c, d, and e are as follows:

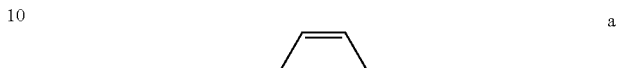

a

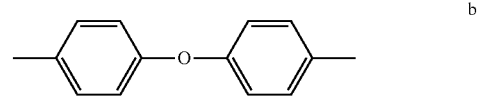

b

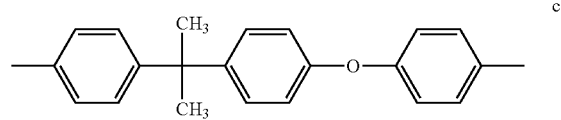

c

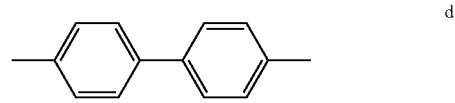

d

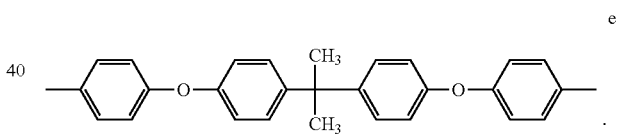

e

Wherein the dianhydride has a structural formula of one of the following two structural formulas:

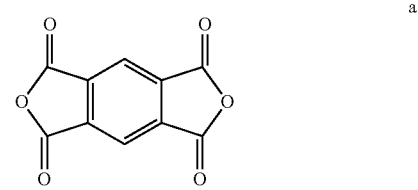

a

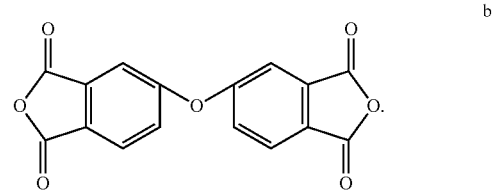

b

One specific reaction route for preparing the compound F is as follows:

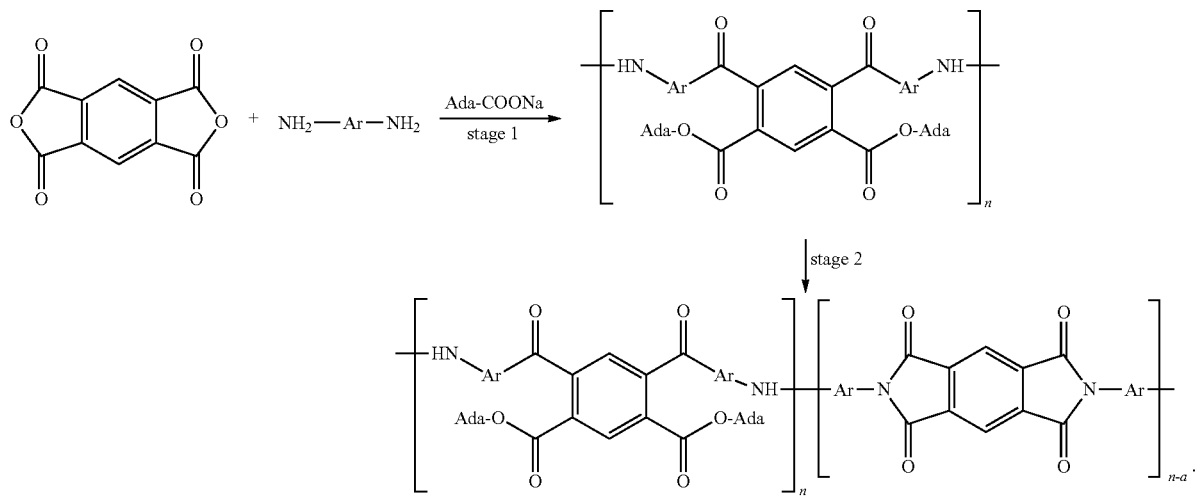

The polyamic acid is stirred to remove bubbles, and then subjected to a solvent removal process by H-VCD. Following it is subjected to stepwise temperature rise using a PI curing method to obtain a target polyimide designated as compound F.

The whole reaction process can be divided into two stages, a product formed in the stage 1 is:

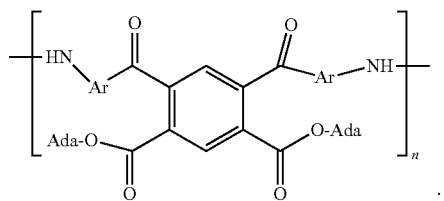

It can be referred to as a precursor of the compound F of the polyamic acid solution. In this stage, the bubbles are not removed by stirring.

Then proceed to the next step to remove the solvent by H-VCD. The specific conditions are drying at 40-90° C. for 9-15 minutes, and the target product designated as compound F as shown below is obtained:

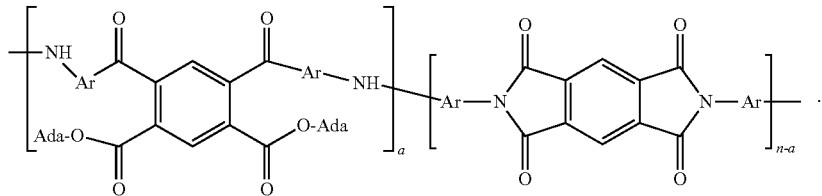

Step S4, preparing a polyimide composite, wherein the polyimide composite is prepared by formulating the compound E and the compound F to form a mixture, and wherein the $Fe_3O_4$ contained in the mixture is within a range of 3-18% by weight.

Thus, the polyimide composite of the present invention is finally obtained, the structural formula thereof can be expressed as: $PI/Fe_3O_4\text{-}(\beta\text{-CD-Ada})x$, wherein $x=3\text{-}5$.

The invention relates to a polyimide composite which is imparted with a good electromagnetic radiation shielding property by introducing magnetic particles $Fe_3O_4$ to a material. A repair ability of the material is imparted by the interaction between a host molecule and a guest molecule, thereby, a polyimide composite having both properties of electromagnetic radiation shielding and self-repairing is realized.

Further, another embodiment provides an application of the polyimide composite according to the present invention to a PI film of a display panel.

Wherein the PI film is prepared by formulating the compound E and the compound F according to a certain mass ratio, stirring at 0° C. for 24-96 hours, forming a uniformly stirred polyamic acid solution, alternatively, the polyamic acid solution of a set ratio may be directly provided.

Then, raising a temperature of the solution to 80° C. at a heating rate of 4-8° C./min, spin-coating the solution on a glass substrate, removing 70% of the solvent in an oven at 120° C., and then subjecting the solution to a 400-450° C. constant temperature process. Wherein the highest constant temperature is 450° C., and the constant temperature time is 0.8-1.2 hours. And finally, a PI film composed of the polyimide composite according to the present invention is obtained, which has electromagnetic radiation absorption performance and a self-repairing property.

Please refer to FIG. 1, which illustrates three PI coatings composed of the polyimide composite with three different proportions of $Fe_3O_4$ particles according to the present invention. Their electromagnetic radiation absorption performance varies with the proportions of the $Fe_3O_4$ particles.

It can be seen in FIG. 1, when the content of $Fe_3O_4$ is 5 wt %, the electromagnetic radiation absorption performance is relatively low. When the content of $Fe_3O_4$ is increased to more than 10%, the electromagnetic radiation absorption performance is further enhanced. However, in consideration of the compatibility problem, it is not possible to add an unlimited amount of the $Fe_3O_4$, it is preferable to control the content of $Fe_3O_4$ to about 15 wt %.

Figure 2:
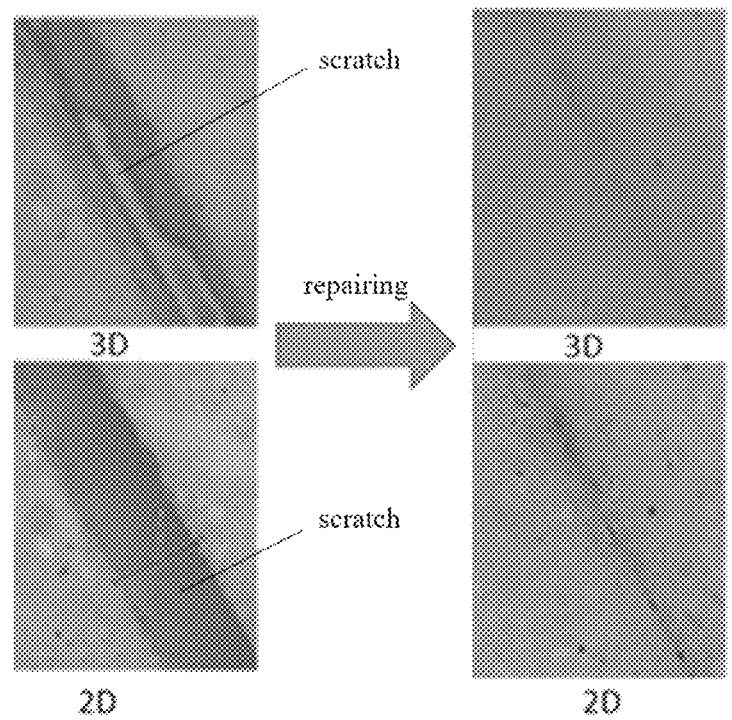
FIG. 2 is a photograph showing a polyimide composite containing magnetic $Fe_3O_4$ particle according to the present invention before and after repair.

Further, please refer to FIG. 2. It illustrates a polyimide composite material containing magnetic $Fe_3O_4$ particles according to the present invention, showing ultra-depth pictures before and after repair.

The polyimide composite material according to the present invention can be widely applied to factories having electromagnetic radiation, for example, organic light emitting diode (OLED) factories, semiconductor factories, etc. The polyimide composite material has broad application prospect and market prospect.

The description of the above exemplary embodiments is only for the purpose of understanding the invention. It is to be understood that the present invention is not limited to the disclosed exemplary embodiments. It is obvious to those skilled in the art that the above exemplary embodiments may be modified without departing from the scope and spirit of the present invention.

What is claimed is:

1. A polyimide composite having a structural formula of $PI/Fe_3O_4\text{-}(\beta\text{-CD-Ada})x$, wherein $x=3\text{-}5$.

2. The polyimide composite according to claim 1, wherein the polyimide composite adopts a preparation material comprising an assembly of $Fe_3O_4\text{-}(\beta\text{-CD-Ada})x$ and polyamic acid, wherein $x=3\text{-}5$.

3. The polyimide composite according to claim 2, wherein a structural formula of the polyamic acid is:

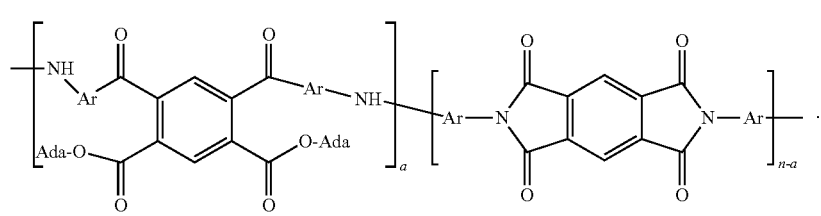

4. The polyimide composite according to claim 2, wherein the preparation material of the polyamic acid comprises diamine: $NH_2\text{—Ar—}NH_2$, dianhydride, and sodium adamantane carboxylate.

5. The polyimide composite according to claim 4, wherein the diamine has a structural formula of one of the following five structural formulas:

Ar is anyone of a, b, c, d, and e, wherein structural formulas of a, b, c, d, and e are as follows:

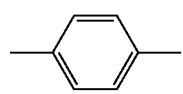

a

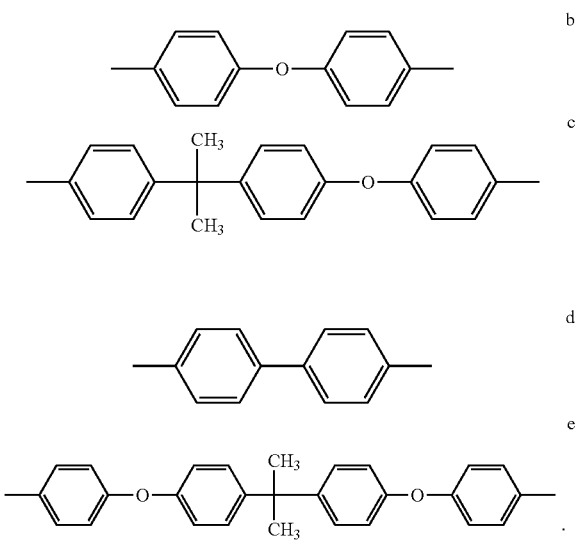

6. The polyimide composite according to claim 4, wherein the dianhydride has a structural formula of one of the following two structural formulas:

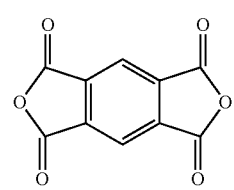

a

-continued

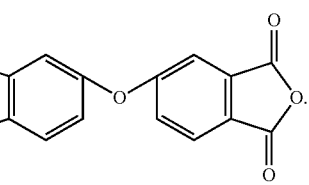

b

7. A preparation method for preparing the polyimide composite according to claim 1, comprising the steps of:

step S1, preparing a host molecule, wherein the host molecule is prepared by grafting β-cyclodextrin onto $Fe_3O_4$ particle, and a product designated as compound A is obtained;

step S2, preparing an assembly, wherein the assembly is formed by using adamantane as a guest molecule and the compound A as host molecule to react, and wherein the assembly designated as compound E is obtained;

step S3, preparing a polyamic acid solution, wherein the polyamic acid solution is prepared by having compound C which is diamine: $NH_2$—Ar—$NH_2$, compound D which is dianhydride, and sodium adamantane carboxylate to react in a solution, and wherein the obtained polyamic acid solution, which is compound F, contains the polyamic acid having the guest molecule grafted with an adamantane molecule; and step S4, preparing a polyimide composite, wherein the polyimide composite is prepared by formulating the compound E and the compound F to form a mixture, and wherein the $Fe_3O_4$ contained in the mixture is within a range of 3-18% by weight.

8. The preparation method according to claim 7, wherein in the step S2, a molar ratio of the compound A which is the host molecular to the adamantane which is the guest molecule is (2-3):(1-3).

9. The preparation method according to claim 7, wherein in the step S3, the compound C, the compound D, and the sodium adamantane carboxylate are sufficiently dissolved in a solvent of N-methyl pyrrolidone and are sufficiently stirred, and the solvent is heated to 70-90° C. for 6-10 hours, whereby the polyamic acid solution is obtained.

10. The preparation method according to claim 7, wherein in the step S3, a molar ratio between the compound C and the compound D is within a range of 1.05-2.

11. A display panel, comprising a substrate, wherein the substrate is provided with a polyimide film, the polyimide film adopts a material comprising the polyimide composite according to claim 1.

12. A preparation method for preparing the display panel according to claim 11, comprising the steps of:
providing the polyimide composite according to claim 1, wherein the polyimide composite contains the $Fe_3O_4$ within a range of 3-18% by weight;
stirring the polyamic acid solution to form a uniformly mixed polyamic acid solution, then raising a temperature of the polyamic acid solution to 70-100° C., and thereafter the polyamic acid solution is spin-coated on a glass substrate of the display panel; and
removing 50-70% of solvent in the polyamic acid solution coated on the glass substrate under a temperature of 110-130° C., and raising the temperature and then keeping the temperature at a constant temperature of 400-450° C. for performing a constant temperature heating process until a polyimide film formed on the glass substrate is finally obtained.

* * * * *